United States Patent
Menet et al.

(10) Patent No.: US 10,782,091 B2
(45) Date of Patent: Sep. 22, 2020

(54) SYSTEM AND METHOD OF DETECTING THE POSITION OF THE TRIGGER IN GUN REPLICAS

(71) Applicant: GATE Menet, Wojtak Sp. J., Cracow (PL)

(72) Inventors: Marcin Menet, Cracow (PL); Damian Wojtak, Cracow (PL)

(73) Assignee: GATE Menet, Wojtak Sp. J., Cracow (PL)

( * ) Notice: Subject to any disclaimer, the term of this patent is extended or adjusted under 35 U.S.C. 154(b) by 0 days.

(21) Appl. No.: 16/382,655

(22) Filed: Apr. 12, 2019

(65) Prior Publication Data

US 2019/0316871 A1   Oct. 17, 2019

(30) Foreign Application Priority Data

Apr. 13, 2018 (PL) .......................................... 425221
Dec. 17, 2018 (EM) ...................................... 1813227

(51) Int. Cl.
| | | |
|---|---|---|
| F41B 11/00 | (2013.01) | |
| F41B 11/71 | (2013.01) | |
| G01D 5/30 | (2006.01) | |

(52) U.S. Cl.
CPC ................ F41B 11/71 (2013.01); G01D 5/30 (2013.01)

(58) Field of Classification Search
CPC .................................. F41B 11/71; F41A 19/58
See application file for complete search history.

(56) References Cited

U.S. PATENT DOCUMENTS

| | | | |
|---|---|---|---|
| 5,727,538 A * | 3/1998 | Ellis ........................ | F41B 11/52 124/77 |
| 7,089,697 B2 | 8/2006 | Monks | |
| 9,732,748 B2 | 8/2017 | Stein et al. | |
| 2006/0042616 A1 | 3/2006 | Orr | |
| 2008/0105243 A1 | 5/2008 | Monks | |
| 2016/0054082 A1 | 2/2016 | Lupher et al. | |

* cited by examiner

*Primary Examiner* — John A Ricci
(74) *Attorney, Agent, or Firm* — Myers Wolin, LLC

(57) ABSTRACT

A trigger position detection system in replica firearms which comprises a sensor built from at least one light source D1 (5), and at least one receiver Q1 (6) converting a light signal into an electrical signal. The light source D1 (5) and the light receiver Q1 (6) are located on a printed circuit board (7) in a way that they are deviated from the vertical axes running perpendicularly to the upper surface of the cylinder edge by an angle from the range of 0°-90°, and their active surfaces are directed towards the replica trigger (1). A method of detecting the position of the trigger in replica firearms comprising controlling the light source D1 (5) in such a manner that at fixed regular time intervals, each time it emits light for the same period of time, while directing the beam reflected from the surface of the replica trigger (1) towards the receiver Q1 (6).

15 Claims, 22 Drawing Sheets

SYSTEM AND METHOD OF DETECTING THE POSITION OF THE TRIGGER IN GUN REPLICAS

CROSS REFERENCE TO RELATED APPLICATIONS

This application is filed under 35 U.S.C. 111(a) and claims priority to Polish Application No. P.425221, filed Apr. 13, 2018, and to European Application No. 18213227.4, filed Dec. 17, 2018.

FIELD OF THE INVENTION

The subject of the solution is a method for detecting the trigger position in gun replicas, in particular ASG.

BACKGROUND

Airsoft guns are usually faithful copies of original firearms made in a 1:1 scale and shoot pellets using compressed gas.

They are used in airsoft games, training, military simulations, and its users pay attention not only to how accurately the external appearance has been copied, but also expect them to act in a way that best imitates the operation of a real firearm.

Automatic electric guns (AEG) are a variant of ASG replicas, in which the electric motor, by means of a gear transmission, compresses the spring.

In factory models of AEG replicas, the motor is controlled by closing the contacts of the power circuit when the trigger is pressed, which is a mechanical element consisting of one or two parts working together. In AEG replicas, the trigger movement causes direct pressure on the moving part of the trigger switch, and then the sliding moving part causes the contacts to close in the trigger switch and the motor power circuit is closed.

High pressure air guns (HPA) are a variant of ASGs driven by compressed air. In HPA replicas, the trigger movement is analogous, with the difference that the pressure is exerted on the electronic microswitch. Pressing the trigger activates the solenoid valve, which supplies the appropriate dose of compressed air to the chamber.

U.S. Pat. No. 7,089,697 discloses a method for preventing trigger bounce when launching a projectile by a projectile launcher, in particular a paintball marker. The method is based on the detection of the position of the trigger mounted movably on the frame of the marker, between a full non-firing position and a full firing position. In the rear part at the bottom of the trigger there is a spike which hides into the gap in the grip of the marker when the trigger is pulled. Detection of the trigger position is possible thanks to the use of an analog sensor, in particular an analog optical sensor. The sensor, consisting of a light-emitting part and a photosensitive part, is mounted in the gap in the grip. When the trigger is pulled, the spike which hides in the gap blocks the light from the light emitter from being received by the photosensitive part. The threshold for sensing light disturbance for detecting the pressed trigger is usually set in the range of 40-60%. When reading light at 100%, the system recognizes that the trigger is in the non-firing position.

Patent US2016/0054082 specifies the trigger mechanism and a method for detecting the current state of the trigger mechanism of a firearm using optical sensors, serving as a safety mechanism for firearms. The method is based on the use of many optical sensors. The sensors are located on two sides of the components of the trigger mechanism, such as the trigger or the fuse. For the circuit to work properly, it must consist of at least two sensors. The sensors consist of light-emitting electroluminescent diodes and phototransistors which receive light impulses. Remaining in their original position, the movable elements of the trigger mechanism block the flow of light between some of the LEDs and the phototransistors, allowing the flow of light in the remaining sensors. After changing the position, this state is reversed. The optical sensors are configured to detect changes in the intensity of the received light signal. Information is passed to the main controller, which on its basis determines the position of the movable elements of the mechanism.

Patent US2006/042616 describes the use of fiber optic cables in paintball markers. Cables are used to connect the components of optical sensors in order to transfer photoresistors to the stock for better balancing of the marker and to reduce the impact of external conditions on the photoresistors.

A sensor consisting of a light source and a photoresistor is used to detect the trigger position. The light emitted from the source located in the stock is transported through a fiber optic cable to the trigger chamber. On the opposite side of the fiber optic outlet there is an inlet hole of the second optical fiber connected to the light sensor. Detection of the trigger location is based on the analysis of the disturbance of the intensity of light sent through optical fibers to the light sensor resulting from cutting the line of light by the trigger during movement.

In factory models of AEG replicas, the motor is controlled by closing the contacts of the power circuit when the trigger is pressed. The trigger is a mechanical element which consists of one or two parts working together, depending on the type of replica. FIG. 1, FIG. 2 and FIG. 3 show examples of solutions used in AEG replicas, where the movement of the trigger 1 causes direct pressure on the moving part of the trigger switch 3, and then the sliding moving part causes the contacts 4 in the trigger switch 2 to close and the motor power circuit to close.

In HPA replicas, an example of which is illustrated in FIG. 4, the trigger moves the same way, with the difference that the pressure is exerted on the microswitch 2. Pressing the trigger 1 activates the solenoid valve which supplies the correct dose of compressed air to the chamber.

The operation of the trigger in well-known AEG and HPA replicas has several basic disadvantages such as: no possibility to configure the sensitivity of the trigger individually to the user's needs, burning contacts in trigger switches of AEG replicas due to the current flowing in the circuit and the resulting malfunction of the weapon, low resistance of microswitches to mechanical damage and limited number of short-circuit cycles and contacts opening.

The essence of the solution according to the first invention is based on the fact that the system is equipped with a sensor made of at least one light source and at least one detector converting a light signal into an electrical signal, wherein the light source D1 and the light receiver Q1 are arranged on the printed circuit board in such a way that they are inclined from the vertical axes run perpendicular to the upper edge of the cylinder by an angle between 0-90°, and their active surfaces are directed towards the trigger of the replica. The light source D1 is connected to the microcontroller pin. The light receiver Q1 is connected to an analog microcontroller pin equipped with an analog-to-digital converter or to an analog-to-digital converter U1 which is coupled with the microcontroller.

Advantageously the light source D1 is a light-emitting diode and/or a laser diode.

Advantageously the light receiver Q1 is a phototransistor and/or a photodiode and/or a photoresistor and/or a CCD detector.

The essence of the solution according to the second invention is based on the fact that the light source D1 is controlled in such a manner that at fixed regular time intervals, each time it emits light for the same period of time. The beam of light reflected from the surface of the replica trigger is directed towards the receiver Q1, which converts into the electric current alternately the reflected light intensity and the intensity of light reaching the receiver Q1 from the surroundings of the replica or the intensity of only the light reaching the receiver Q1 from the surroundings of the replica. The electric current flows through the resistor R2, causing a voltage drop at its terminals. The analog-to-digital converter converts the voltage of the resistor R2 into a digital form and its value is stored in the buffer storing the last five results. After each fixed time interval, the voltage drop data is analyzed in the microcontroller and the difference between samples pr[1] and pr[0], pr[1] and pr[2], pr[3] and pr[2], pr[3] and pr[4] is calculated, wherein the samples pr[0], pr[2] and pr[4] constitute the intensity of only the light coming from the environment of the replica, and pr[1] and pr[3] are the sum of the intensity of light emitted by the light source D1 and then reflected from the surface of the replica trigger and the light intensity coming from the environment of the replica. When calculating the difference values for the respective samples, the intensity of only the light emitted by the light source D1 is obtained. If at least one of the four differences between samples pr[1] and pr[0], pr[1] and pr[2], pr[3] and pr[2], and pr[3] and pr[4] is less than the threshold defined previously by the user of the replica in the calibration process, it is treated as a released trigger. The calibration process is carried out using applications dedicated to various stationary and mobile devices, and during this process the level of light intensity reaching the receiver Q1 is determined when the trigger is released, pressed, and when the trigger is pressed to the position activating the motor. If each difference between samples pr[1] and pr [0], pr[1] and pr[2], pr[3] and pr[2], pr[3] and pr[4] is equal to or greater than the threshold defined by the user, it is treated as a pressed trigger and this triggers the projectile launch.

Advantageously the light source D1 is a light-emitting diode and/or a laser diode.

Advantageously the light receiver Q1 is a phototransistor and/or a photodiode and/or a photoresistor and/or a CCD detector.

Advantageously the calibration process is carried out using applications dedicated to various stationary and mobile devices, and during this process the level of light intensity reaching the receiver Q1 is determined when the trigger is released, pressed, and when the trigger is pressed to the position activating the motor.

The essence of the solution according to the third invention is that the system is equipped with a sensor built from two light sources and one detector converting a light signal into an electrical signal, wherein the light sources D1 and D2 and the light receiver Q1 are placed on two separate printed circuit boards arranged parallel to each other, between which the trigger of the replica moves. The active surfaces of the light sources D1 and D2 and the light receiver Q1 are directed towards the replica trigger.

The positions of the light sources D1 and D2 and the light receiver Q1 are strictly defined relative to the position of the replica trigger. The edges of the active surfaces of the light source D1 and the light receiver Q1 located closer to the replica trigger are contained in the plane intersecting both printed circuit boards perpendicularly. The distance between the light sources D1 and D2, the light receiver Q1 and the trigger is set in such a way that the replica trigger in the released position forms a shadow originating from the light source D2 over a small area of the active surface of the light receiver Q1. Light source D2 is arranged in relation to light source D1 so that there is only one position of the trigger, such that the replica trigger forms a shadow originating from the light source D2 over the entire active surface of the light receiver Q1. The light sources D1 and D2 are connected to the microcontroller pin. The light receiver Q1 is connected to an analog microcontroller pin equipped with an analog-to-digital converter or to an analog-to-digital converter U1 which is coupled with the microcontroller.

Advantageously the light sources D1 and D2 are light emitting diodes.

Advantageously the light receiver Q1 is a phototransistor and/or a photodiode and/or a photoresistor and/or a CCD detector.

The essence of the solution according to the fourth invention is that the light sources D1 and D2 are controlled in such a way that, at fixed regular time intervals, each time they emit light for the same period of time. The emitted light goes in the direction of the receiver Q1, which alternately converts into an electric current the light intensity originating from the light sources D1 and D2 and the intensity of light reaching the receiver Q1 from the environment of the replica, or the intensity of only the light reaching the light receiver Q1 from the environment of the replica. The electric current flows through the resistor R2, causing a voltage drop at its terminals. The analog-to-digital converter converts the voltage of the resistor R2 into a digital form and its value is stored in the buffer storing the last five results. After each fixed time interval, the voltage drop data is analyzed in the microcontroller and using the trigger press recognition algorithm the difference between samples pr[1] and pr[0], pr[1] and pr[2], pr[3] and pr[2], pr[3] and pr[4] is calculated, wherein the samples pr[0], pr[2] and pr[4] are the intensity of only the light coming from the environment of the replica, and pr[1] and pr[3] are the sum of the light intensity emitted by the light sources D1 and D2 and the intensity of the incoming light from the surroundings of the replica. When calculating the difference values for the respective samples, the intensity of only the light emitted by the light sources D1 and D2 is obtained. If at least one of the four differences between samples pr[1] and pr[0], pr[1] and pr[2], pr[3] and pr[2], pr[3] and pr[4] is more than the threshold defined previously by the user of the replica in the calibration process, it is treated as a released trigger. However, if each difference between samples pr[1] and pr [0], pr[1] and pr[2], pr[3] and pr[2], pr[3] and pr[4] is equal to or less than the threshold defined by the user, it is treated as a pressed trigger and this triggers the projectile launch.

Advantageously the light sources D1 and D2 are light emitting diodes.

Advantageously the light receiver Q1 is a phototransistor and/or a photodiode and/or a photoresistor and/or a CCD detector.

Advantageously the calibration process is carried out using applications dedicated to various stationary and mobile devices, and during this process the level of light intensity reaching the receiver Q1 is determined when the trigger is released, pressed, and when the trigger is pressed to the position activating the motor.

The main advantage of the inventions described above is the fact of using such sensors that are not damaged by normal operation, are trouble-free and maintenance-free. The sensors are connected to the input of the analog-to-digital converter, whose processing result is analyzed by the microcontroller, ensuring a precise analysis of the received signal and the precise determination of the position of the replica trigger. Thanks to the miniature dimensions, it is possible to use, according to the need, more than one number of sources and receivers of light, and thus, more precisely control the position of the trigger.

In addition, the algorithm of control and analysis of the signal reaching the sensors makes them resistant to the impact of external lighting, and the electronic photoelements, due to their structure, are resistant to a wide range of temperatures, moisture, vibrations, surges, and electromagnetic interference.

Users of the replica can adjust and optimize the operation of the replica to meet their needs by calibrating the settings.

The object of the solution described and claimed in the present application is presented in its various embodiments shown in figures referenced below.

DETAILED DESCRIPTION OF THE PREFERRED EMBODIMENTS

Figure 1:
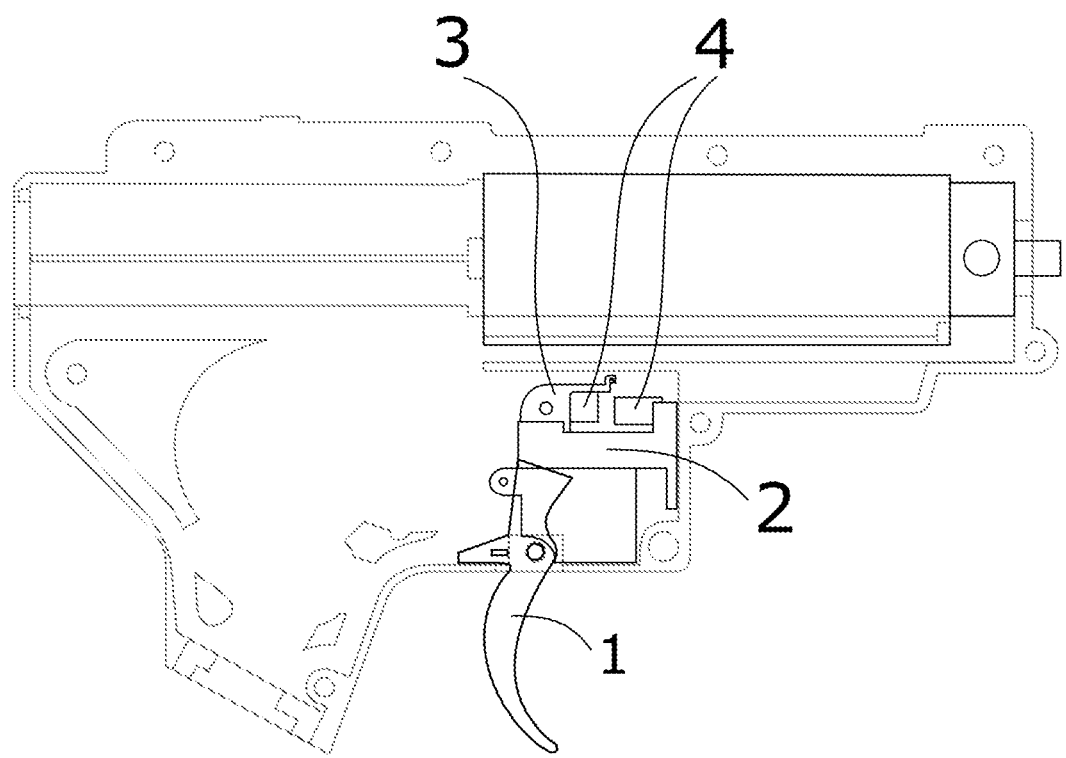
FIG. 1 shows an example of the solution used in AEG replicas.
Figure 2:
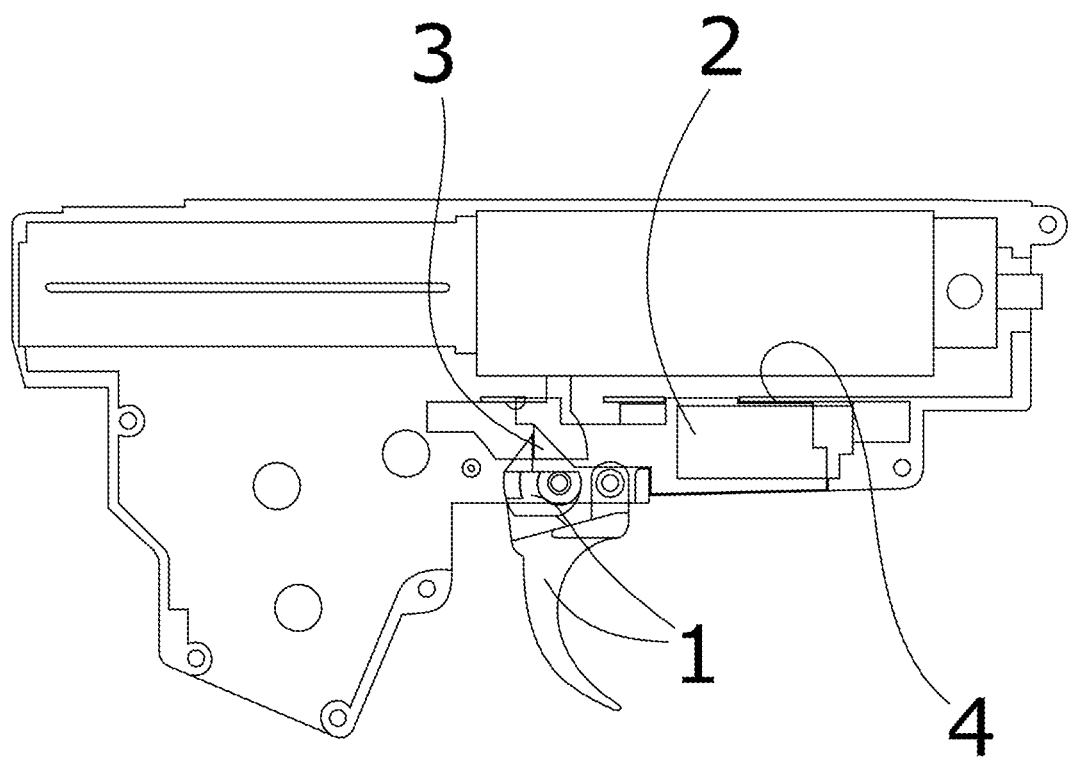
FIG. 2 shows another example of the solution used in AEG replicas.
Figure 3:
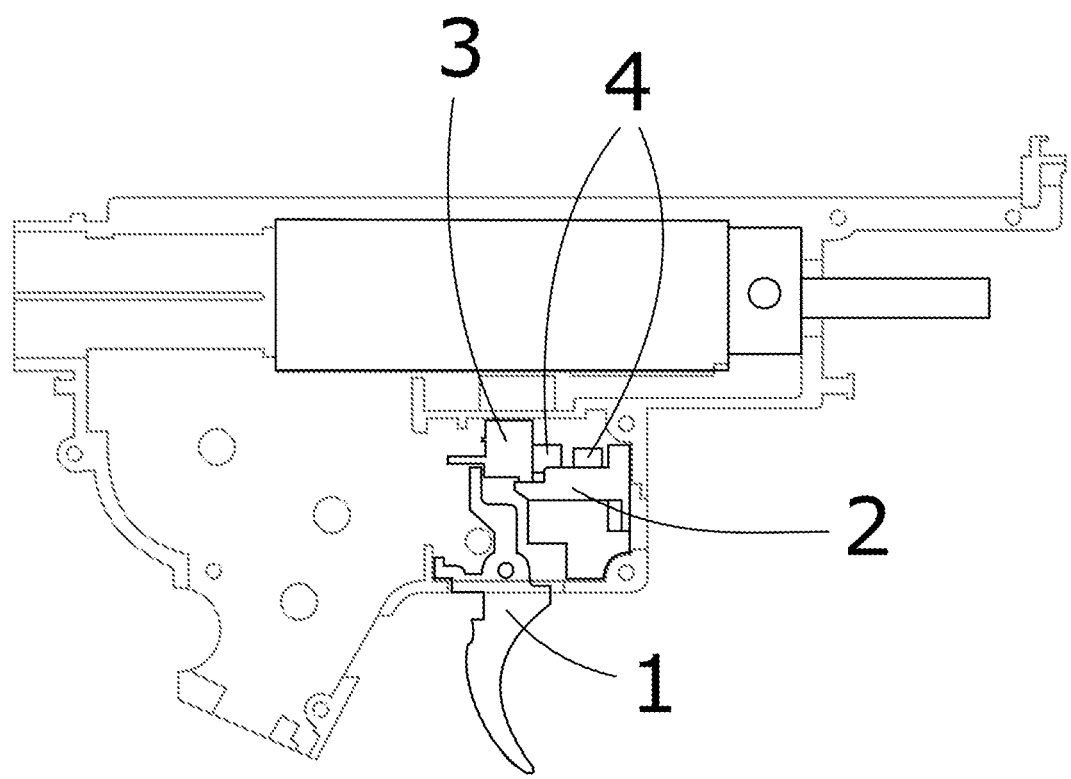
FIG. 3 shows another example of the solution used in AEG replicas.
Figure 4:
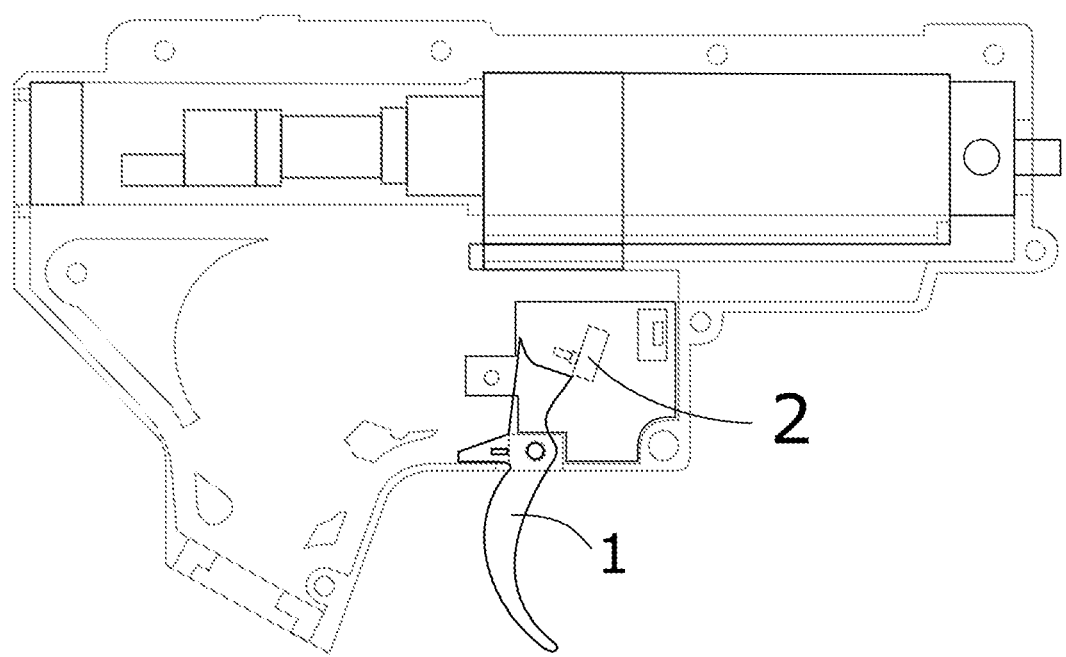
FIG. 4 shows an example of the solution used in HPA replicas.
Figure 5:
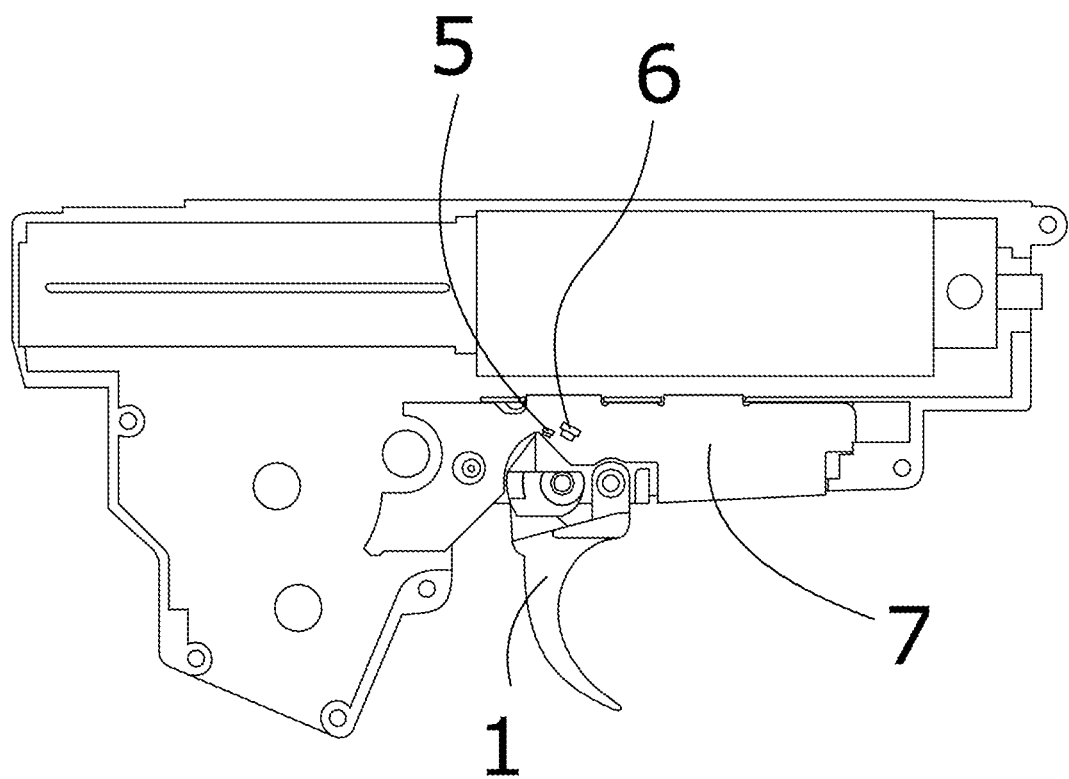
FIG. 5 shows a diagram of the interior of the replica of the first invention.
Figure 6:
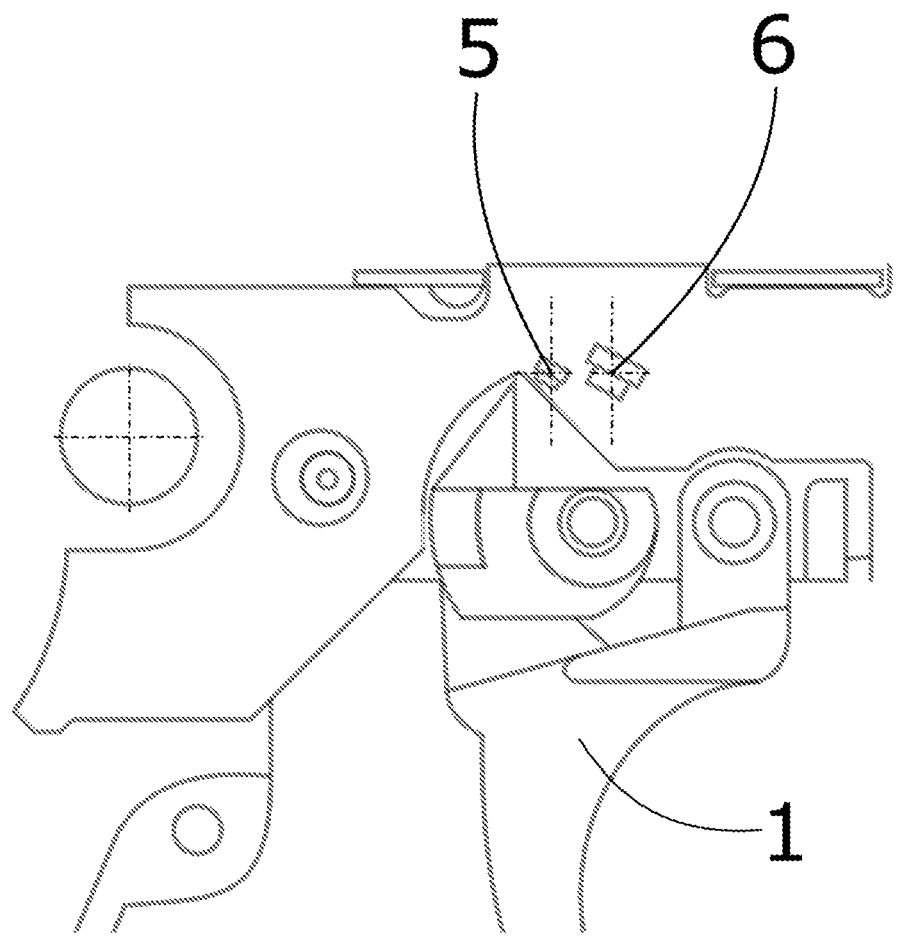
FIG. 6 shows a fragment of the interior at a larger scale.
Figure 7:
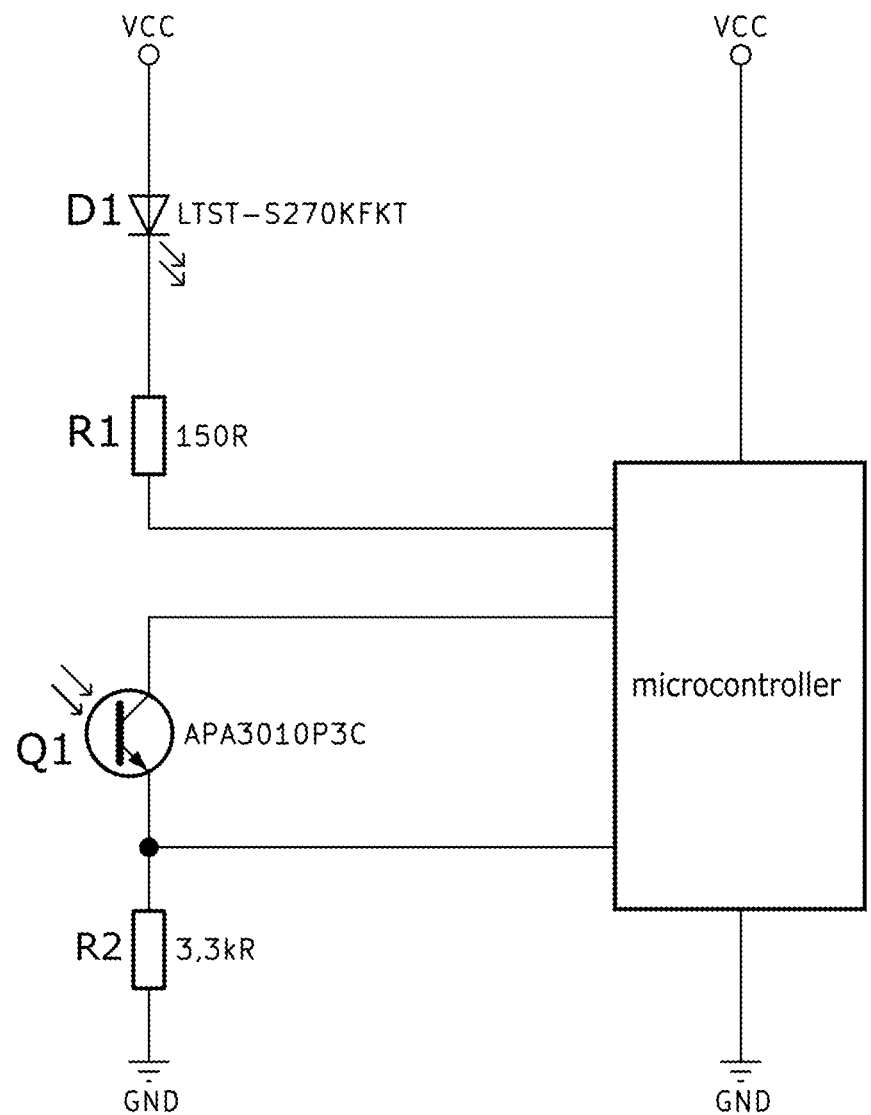
FIG. 7 shows a circuit diagram of a reflective optical sensor in which the microcontroller is equipped with an analog-to-digital converter.
Figure 8:
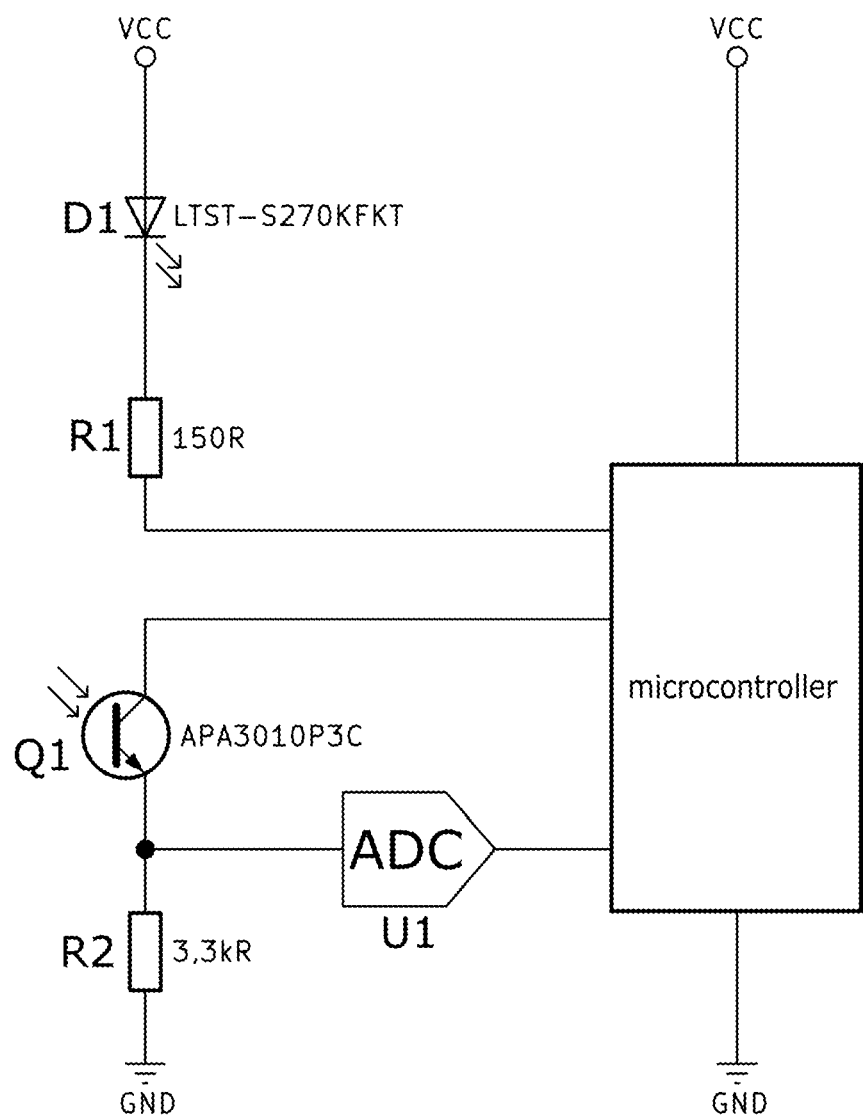
FIG. 8 shows a circuit diagram of a reflective optical sensor in which the microcontroller is coupled to an analog-to-digital converter.
Figure 9:
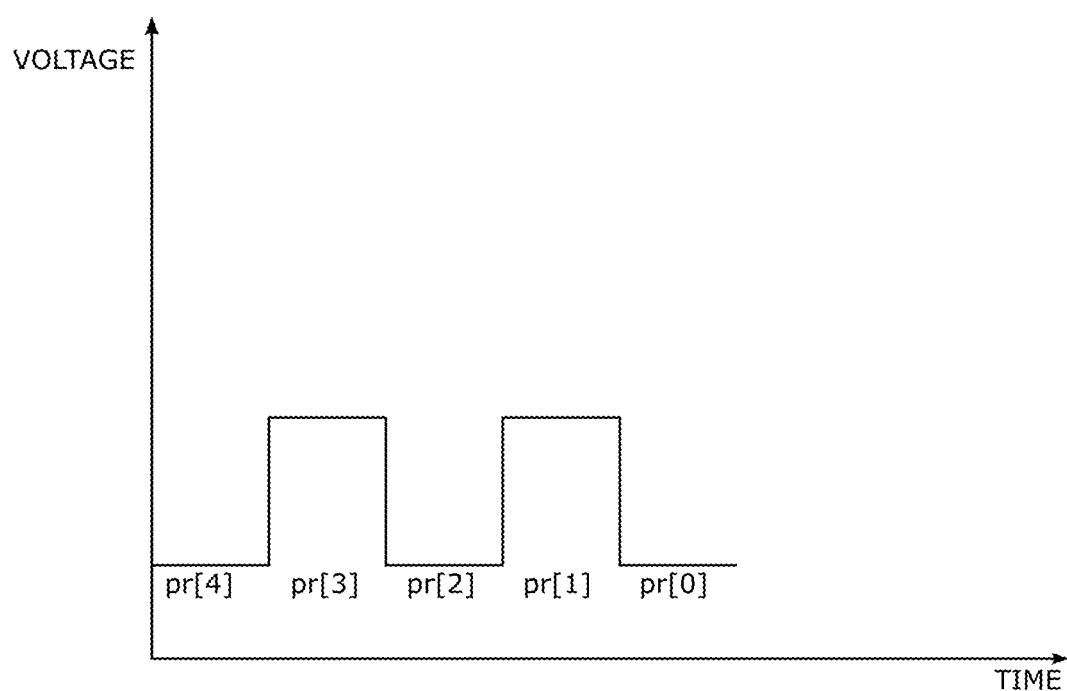
FIG. 9 shows a graph of the voltage values as a function of time from the last five measurements for a released trigger.
Figure 10:
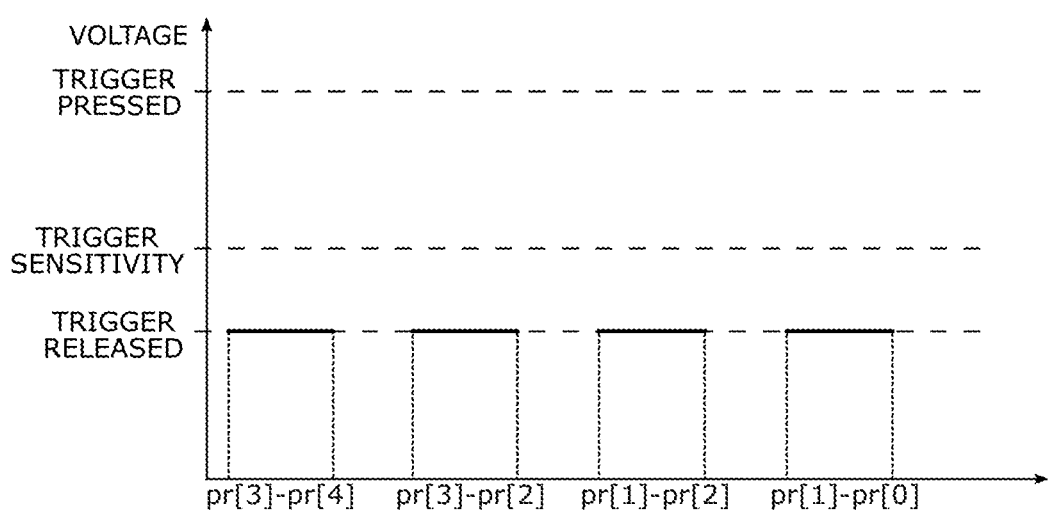
FIG. 10 shows a graph of the difference values of the signals visible in FIG. 9.
Figure 11:
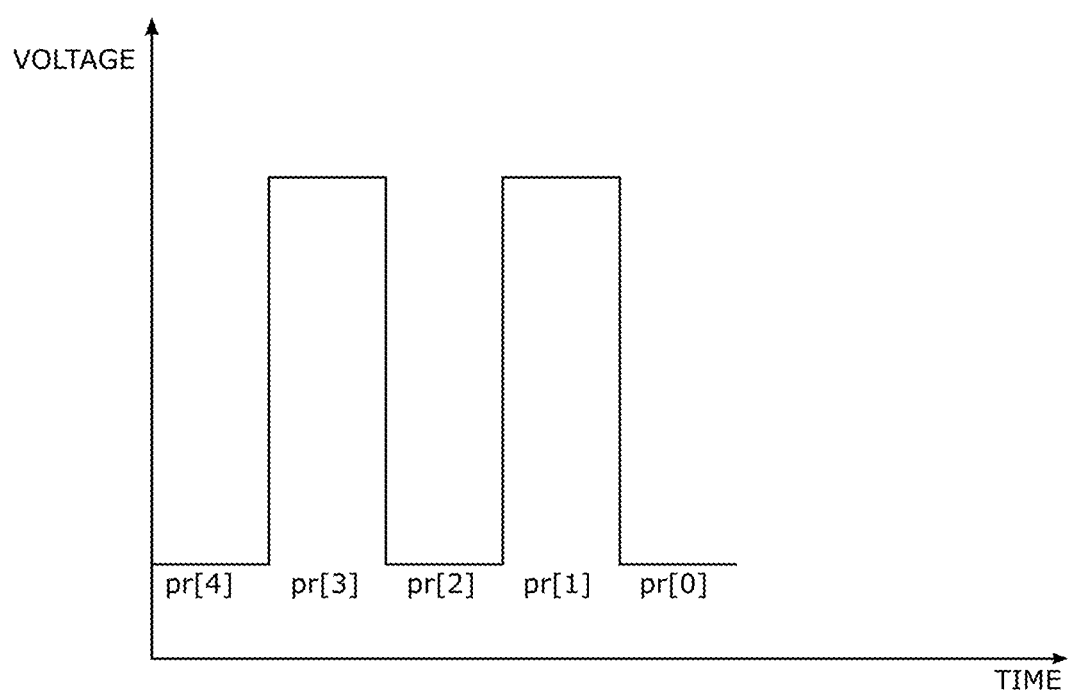
FIG. 11 shows a graph of the value of five consecutive measurements for the pressed trigger.
Figure 12:
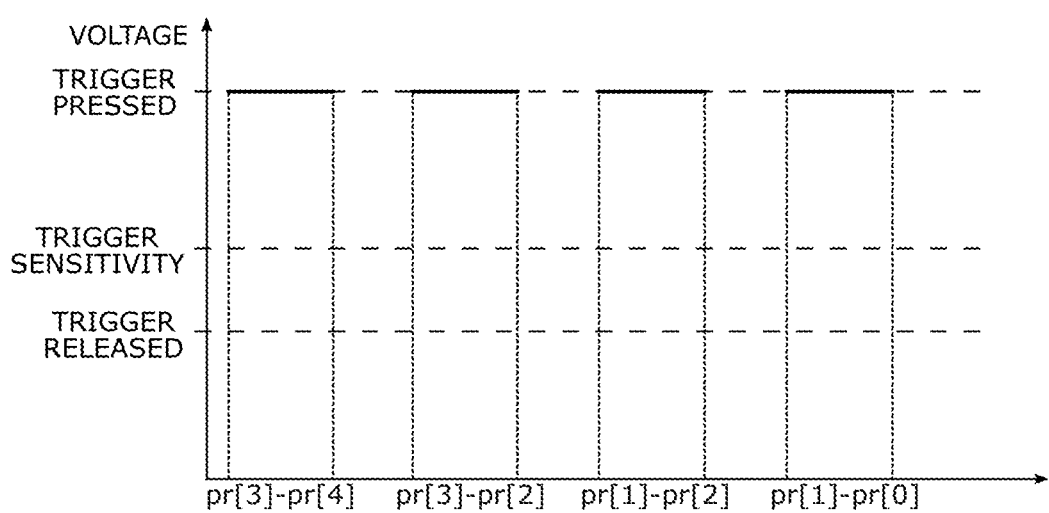
FIG. 12 shows a graph of the difference values of the signals visible in FIG. 11.
Figure 13:
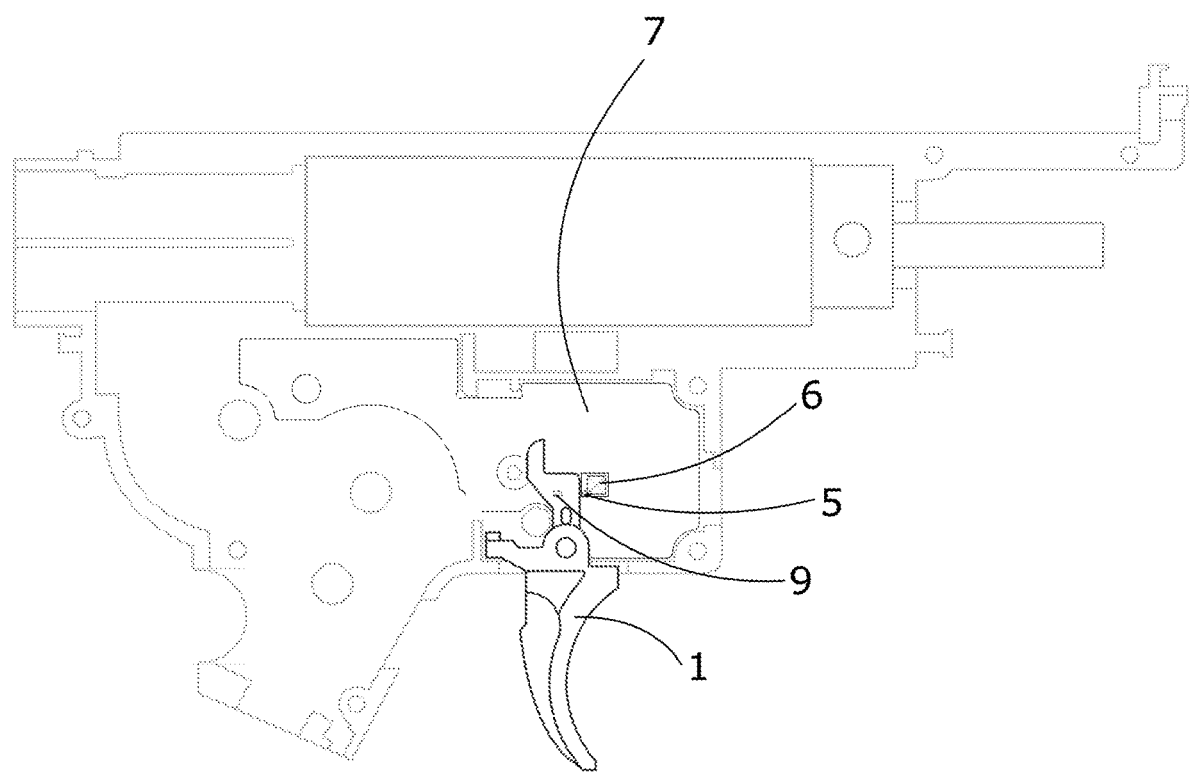
FIG. 13 shows how the sensor elements are arranged relative to the trigger (front view) in the third invention.
Figure 14:
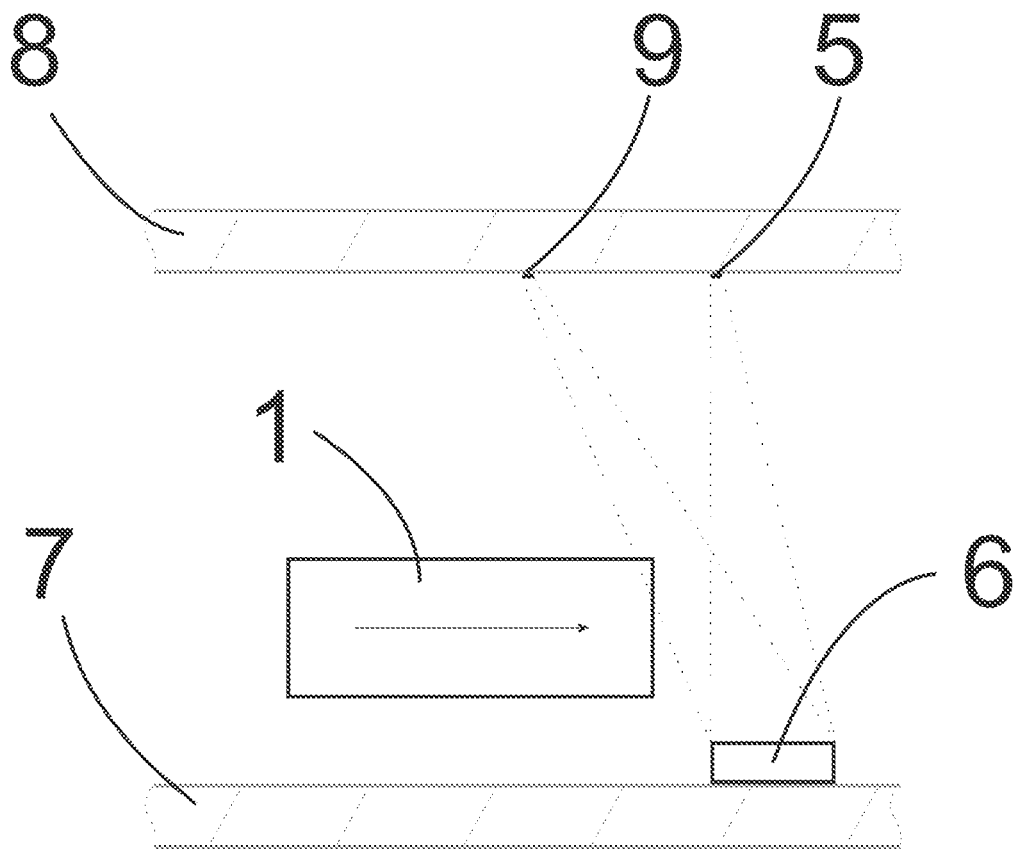
FIG. 14 shows is a view of the sensor elements from above.
Figure 15:
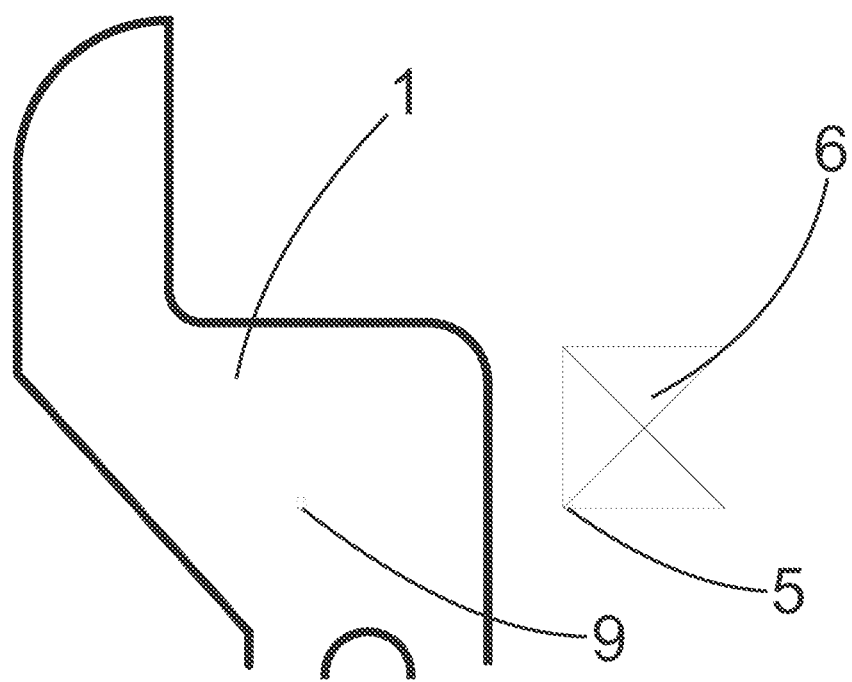
FIG. 15 shows a view of sensor elements from the front.
Figure 16:
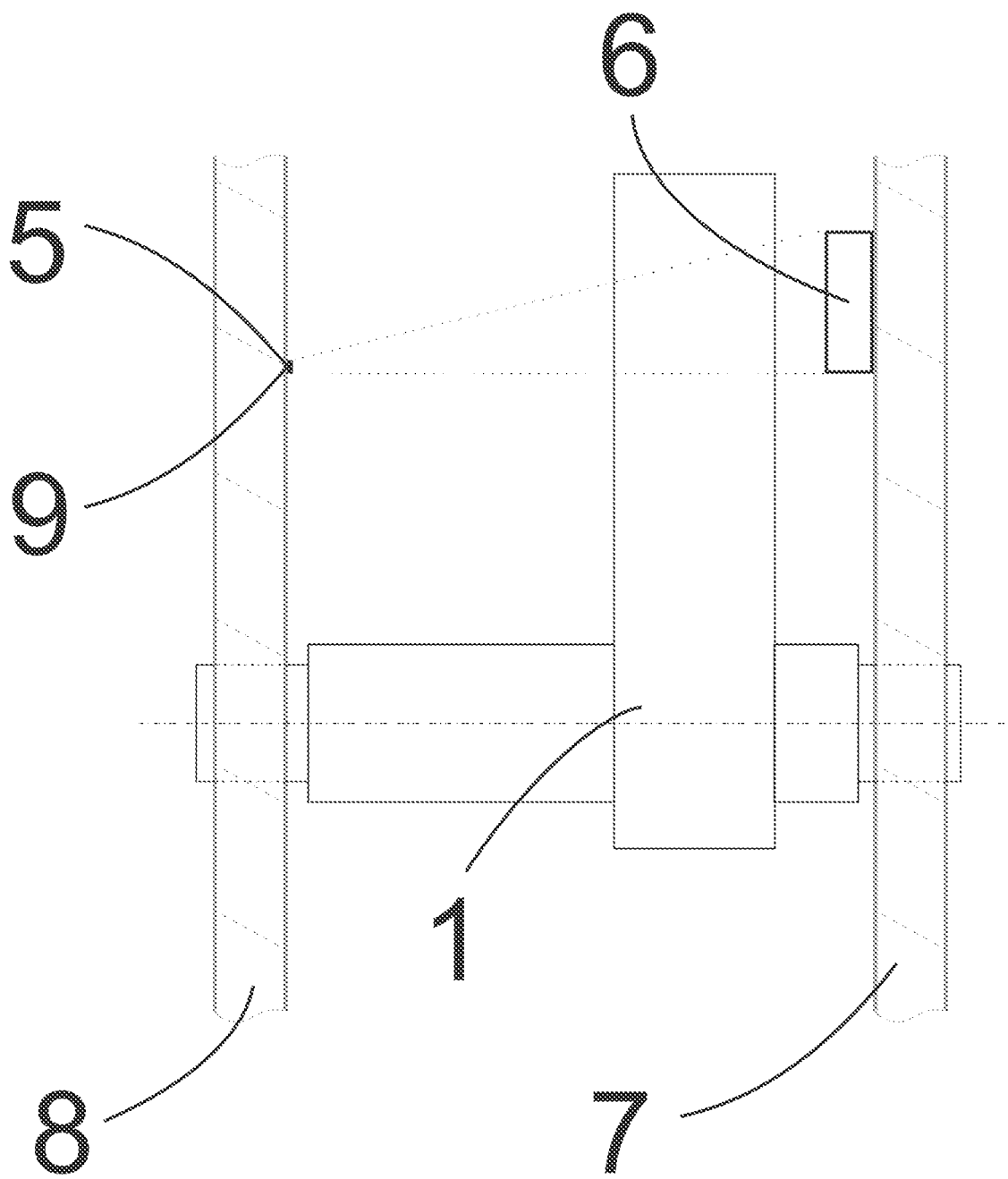
FIG. 16 shows a view of the sensor elements from the left.
Figure 17:
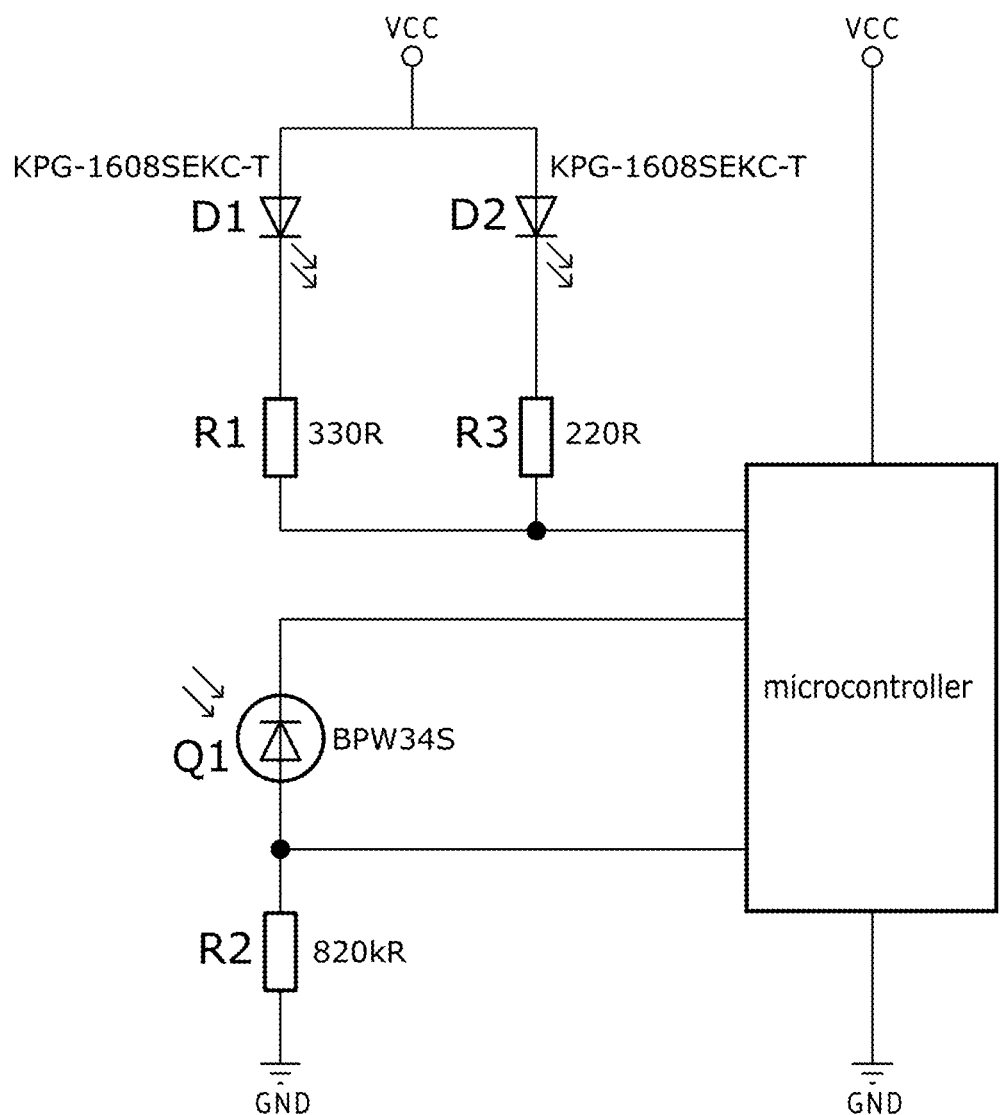
FIG. 17 shows a circuit diagram of the optical sensor in which the microcontroller is equipped with an analog-to-digital converter.
Figure 18:
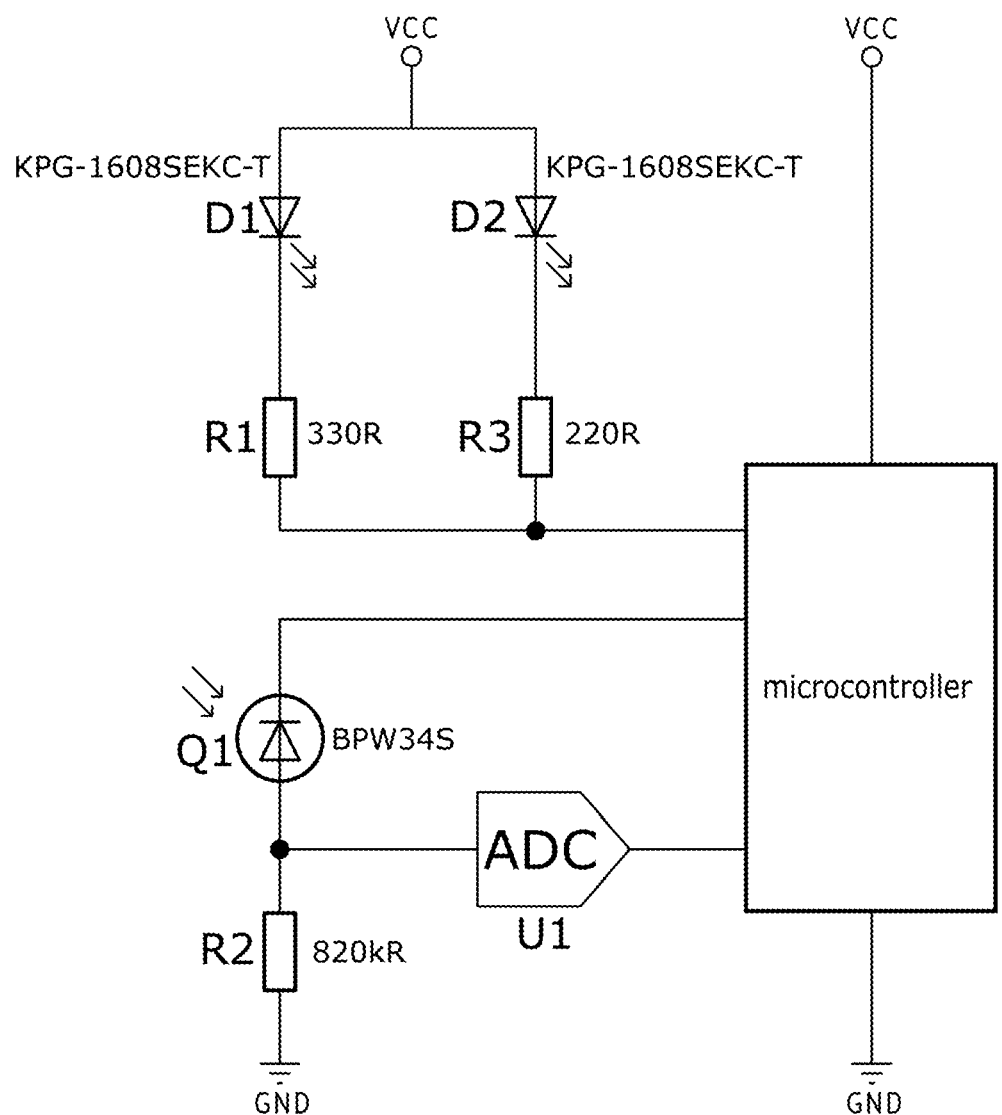
FIG. 18 shows a circuit diagram of an optical sensor in which the microcontroller is coupled to an analog-to-digital converter.
Figure 19:
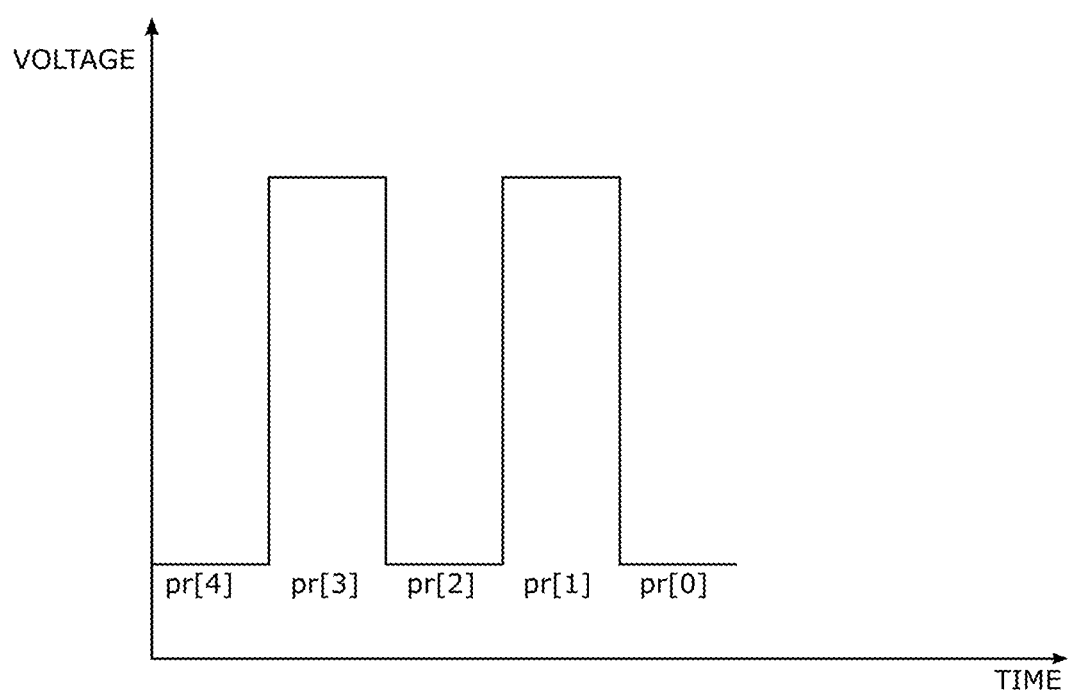
FIG. 19 shows a graph of the voltage values as a function of time from the last five measurements for a released trigger.
Figure 20:
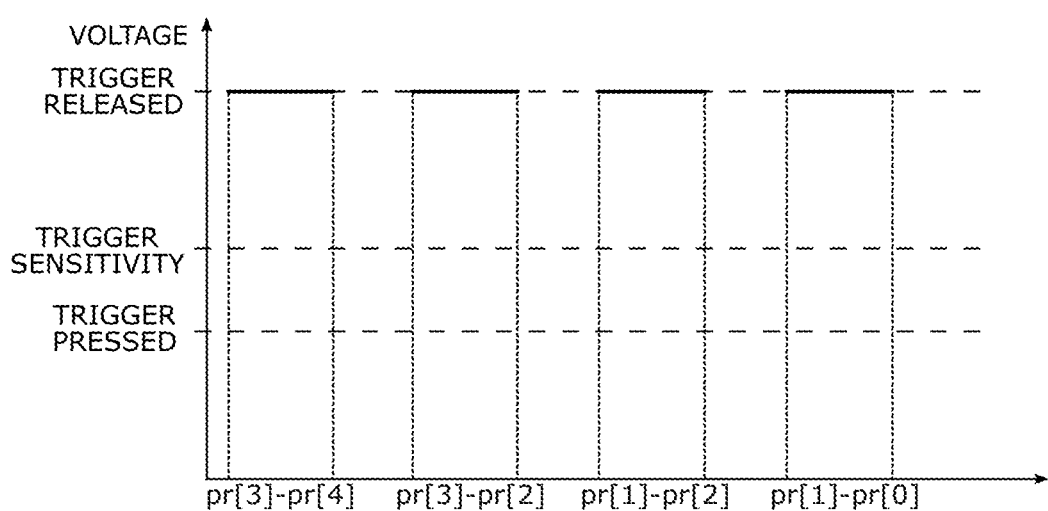
FIG. 20 shows a graph of the difference values of the signals visible in FIG. 19.
Figure 21:
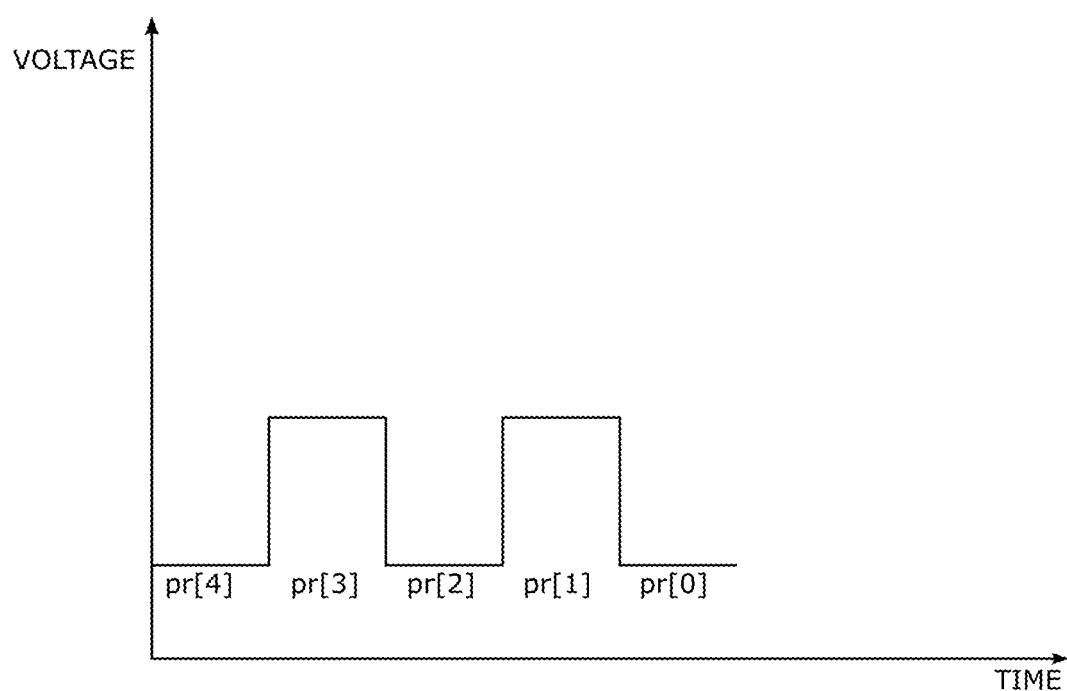
FIG. 21 shows a graph of the value of five consecutive measurements for the pressed trigger.
Figure 22:
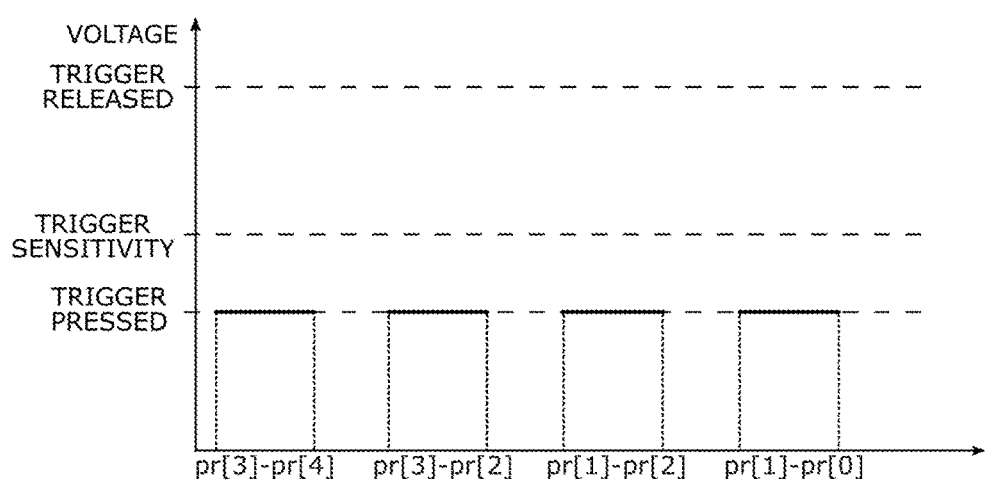
FIG. 22 shows a graph of the difference values of the samples r_pr of the signal visible in FIG. 21.

The subject of the first invention is illustrated in the drawing, where FIG. 5 is a diagram of the interior of the replica, and FIG. 6 is a fragment of this interior at a larger scale, while FIG. 7 is a circuit diagram of a reflective optical sensor in which the microcontroller is equipped with an analog-to-digital converter, FIG. 8 is a circuit diagram of a reflective optical sensor in which the microcontroller is coupled to an analog-to-digital converter, FIG. 9 is a graph of the voltage values as a function of time from the last five measurements for a released trigger, FIG. 10—a graph of the difference values of the signals visible in FIG. 9, FIG. 11—a graph of the value of five consecutive measurements for the pressed trigger, FIG. 12—a graph of the difference values of the signals visible in FIG. 11. The subject of the third invention is illustrated in the drawing, where FIG. 13 illustrates how the sensor elements are arranged relative to the trigger (front view), FIG. 14 is a view of the sensor elements from above, FIG. 15 is a view of sensor elements from the front, FIG. 16 is a view of the sensor elements from the left, FIG. 17 is a circuit diagram of the optical sensor in which the microcontroller is equipped with an analog-to-digital converter, FIG. 18 is a circuit diagram of an optical sensor in which the microcontroller is coupled to an analog-to-digital converter, FIG. 19 is a graph of the voltage values as a function of time from the last five measurements for a released trigger, FIG. 20—a graph of the difference values of the signals visible in FIG. 19, FIG. 21—a graph of the value of five consecutive measurements for the pressed trigger, FIG. 22—a graph of the difference values of the samples r_pr of the signal visible in FIG. 21.

Example I

The system is equipped with a sensor built from a single light source, which is a light-emitting diode or a laser diode, and one detector converting a light signal into an electrical signal, which is a phototransistor or photodiode or photoresistor or CCD detector, and the light source D1 5 and the light receiver Q1 6 are placed on the printed circuit board 7 in such a way that they are inclined from vertical axes routed perpendicular to the upper edge of the cylinder by an angle of 27°, and their active surfaces are directed towards the replica trigger 1. The light source D1 5 is connected to the microcontroller pin. The light receiver Q1 6 is connected to an analog microcontroller pin equipped with an analog-to-digital converter as shown in FIG. 8 or to an analog-to-digital converter that is coupled to the microcontroller as shown in FIG. 9.

The light source D1 5 is a light-emitting diode or a laser diode. The microcontroller controls the light source D1 5 every 500 us as follows: for 500 us the light source D1 5 shines and for the next 500 us the light source D1 5 is off. This cycle is repeated and the light emitted by the light source D1 5 is reflected from the moving part of the trigger 1. Depending on the extent to which the trigger 1 is pressed, the receiver Q1 6 is illuminated less or more strongly by the light reflected from the moving surface of the trigger 1. The receiver Q1 6 converts the light intensity into an electric current, which flows through the resistor R2, causing a voltage drop at its terminals. The analog-to-digital converter converts this voltage into a digital form. Samples are taken every 500 us. Exactly 100 us after taking a sample, the state of the light source D1 5 is changed. Each voltage sample in digital form is stored in a buffer which contains the last five read samples. After each change in the state of the light source D1 5, the microcontroller analyzes the data stored in the buffer.

Samples: pr [0], pr [2] and pr [4] are read when the light source D1 5 is off and reflect the intensity value of only the ambient light reaching the receiver Q1 6. Samples: pr [1] and pr [3] are read when the light source D1 5 is on and reflect the intensity value of the sum of ambient light and the light emitted by the light source D1 5. When calculating the difference values between the odd samples pr [1] and pr [3] and the even samples pr [0], pr [2] and pr [4], the intensity value of only the light emitted by the light source D1 5 is obtained. If at least one of the four differences between samples pr[1] and pr[0], pr[1] and pr[2], pr[3] and pr[2], pr[3] and pr[4] is less than the threshold defined previously by the user of the replica in the calibration process, it is treated as a released trigger. If each difference between samples pr[1] and pr [0], pr[1] and pr[2], pr[3] and pr[2], pr[3] and pr[4] is equal to or greater than the threshold defined by the user, it is treated as a pressed trigger 1 and this triggers the projectile launch. Calibration, which determines the level of light intensity reaching the receiver Q1 6 when the trigger 1 is released, when the trigger 1 is pressed down, and when the trigger 1 is pressed to the position activating the motor, is carried out using applications dedicated to various stationary and mobile devices.

The light receiver Q1 6 is a phototransistor or photodiode or photoresistor or CCD detector.

Example II

The system is equipped with a sensor built of two light sources D1 5 and D2 9, which are light emitting diodes, and one detector Q1 6 converting the light signal into an electrical signal, which is a phototransistor or photodiode or photoresistor or CCD detector, wherein the light sources D1 5, D2 9 and the light receiver Q1 6 are placed on separate printed circuit boards 7 and 8, between which the replica trigger 1 moves. The active surfaces of the light sources D1 5 and D2 9 and the light receiver Q1 6 are directed towards the trigger 1.

The positions of the light sources D1 5 and D2 9 and the light receiver Q1 6 are strictly defined relative to the position of the replica trigger 1. The edges of the active surfaces of the light source D1 5 and the light receiver Q1 6 being closer to the replica trigger 1 are contained in the plane intersecting both printed circuit boards 7 and 8 perpendicularly. The moving trigger 1 of the replica creates a shadow on the active surface of the light receiver Q1 6. In the entire range of the trigger 1 movement, the edge of the shadow is formed by the surface of the trigger 1, which is closer to the light sources D1 5 and D2 9. The distance between the light sources D1 5 and D2 9, the light receiver Q1 6 and the replica trigger 1 is set in such a way that the replica trigger 1 in the released position forms a shadow originating from the light source D2 9 over a small area of the active surface of the light receiver Q1 6. The light source D1 5 illuminates the entire surface of the light receiver Q1 6. In the initial range of the movement of the replica trigger 1, the surface of the shadow originating from the light source D2 9 increases as the trigger 1 is pressed. Light source D2 9 is arranged in relation to light source D1 5 so that there is only one position of the replica trigger 1, such that the trigger 1 forms a shadow originating from the light source D2 9 over the entire active surface of the light receiver Q1 6 and light source D1 5 illuminates the entire surface of the light receiver Q1 6. In the final range of the movement of the trigger, the surface of the shadow originating from the light source D1 5 increases on the active surface of the light receiver Q1 6 as the replica trigger 1 is pressed. A fully-pressed replica trigger 1 creates a partial shadow originating from the light source D1 5 on the active surface of the light receiver Q1 6. Thanks to this solution, the electrical signal generated by the light receiver Q1 6 changes monotonically throughout the entire range of the replica trigger 1 movement.

The light sources D1 5 and D2 9 are connected to the microcontroller pin. The light receiver Q1 6 is connected to an analog microcontroller pin equipped with an analog-to-digital converter as shown in FIG. 17 or to an analog-to-digital converter that is coupled to the microcontroller as shown in FIG. 18.

The light sources D1 5 and D2 9 are light emitting diodes. The microcontroller controls light sources D1 5 and D2 9 every 500 us as follows: for 500 us the light sources D1 5 and D2 9 shine and for the next 500 us are off. This cycle is repeated, and the light emitted by the light sources D1 5 and D2 9 is covered by the replica trigger 1. Depending on the extent to which the trigger 1 is pressed, the receiver Q1 6 is illuminated less or more strongly by the light emitted by the light sources D1 5 and D2 9. The receiver Q1 6 converts the light intensity into an electric current, which flows through the resistor R2, causing a voltage drop at its terminals. The analog-to-digital converter converts this voltage into a digital form. Samples are taken every 500 us. Exactly 100 us after taking a sample, the state of the light sources D1 5 and D2 9 is changed. Each voltage sample in digital form is stored in a buffer which contains the last five read samples. After each change in the state of the light source, the microcontroller analyzes the data stored in the buffer.

Samples: pr[0], pr[2] and pr[4] are read when the light sources D1 5 and D2 9 are off and reflect the intensity value of only the ambient light reaching the light receiver Q1 6. Samples: pr[1] and pr[3] are read when the light sources D1 5 and D2 9 are on and reflect the intensity value of the sum of ambient light and the light emitted by the light sources D1 5 and D2 9. When calculating the difference values between the odd samples pr[1] and pr[3] and the even samples pr [0], pr[2] and pr[4], the intensity value of only the light emitted by the light sources D1 5 and D2 9 is obtained. If at least one of the four differences between samples pr[1] and pr[0], pr[1] and pr[2], pr[3] and pr[2], pr[3] and pr[4] is more than the threshold defined previously by the user of the replica in the calibration process, it is treated as a released trigger. If each difference between samples pr[1] and pr[0], pr[1] and pr[2], pr[3] and pr[2], pr[3] and pr[4] is equal to or less than the threshold defined by the user, it is treated as a pressed trigger 1 and this triggers the projectile launch. Calibration which determines the level of light intensity reaching the receiver Q1 6 when the trigger 1 is released, when the trigger 1 is pressed down, and when the trigger 1 is pressed to the position activating the motor, is carried out using applications dedicated to various stationary and mobile devices.

The light receiver Q1 6 is a phototransistor or photodiode or photoresistor or CCD detector.

The invention claimed is:

1. A system for detection a position of a trigger in replica firearms comprising a sensor made of at least one light source D1 (5) and at least one receiver Q1 (6) converting a light signal into an electrical signal, wherein the light source D1 (5) and the light receiver Q1 (6) are located on a printed circuit board (7) in such a way that the light source and light receiver are deflected from vertical axes running essentially perpendicularly to an upper surface of an edge of a cylinder by an angle ranging from 0° to 90°, wherein
   active surfaces of the light source and light receiver are directed towards the trigger of replica (1), wherein
   the light source D1 (5) is connected to a pin of a microcontroller and the receiver Q1 (6) is connected to an analog pin of a microcontroller equipped with an analog-to-digital converter or to an analog-to-digital converter U1 which is coupled with the microcontroller.

2. The system according to claim 1, wherein the light source D1 (5) is a light-emitting diode or a laser diode.

3. The system according to claim 1, wherein the light receiver Q1 (6) is a phototransistor, a photodiode, a photoresistor or a CCD detector.

4. A method of detecting a position of a trigger in replica firearms wherein
   a light source D1 (5) is steered in such a manner that at constant, regular time intervals, the light source emits light for a constant period of time, wherein a beam of light reflected from a surface of the trigger (1) in a replica is directed towards a receiver Q1 (6), which converts alternately intensity of the reflected light into an electric current and the intensity of the light reaching the receiver Q1 (6) from environment of the replica or the intensity of only the light reaching the receiver Q1 (6) from the environment of the replica, wherein
   the electric current flows through a resistor R2, generating voltage drop at its terminals, wherein
   in an analog-to-digital converter the resistor R2 voltage is converted into a digital signal and its value is stored in a buffer storing last five results, wherein
   after each constant time interval, voltage drop data is analyzed in a microcontroller and a difference between samples pr[1] and pr[0], pr[1] and pr[2], pr[3] and pr[2], pr[3] and pr[4] is calculated, wherein
   the samples pr[0], pr[2] and pr[4] constitute intensity value of only the light coming from the environment of the replica, and the samples pr[1] and pr[3] are a sum of the intensity of the light emitted by the light source D1 (5) and then reflected from the surface of the trigger (1) in replica and the light intensity coming from the environment of the replica, calculating the difference values for the respective samples and obtaining the intensity value of only the light emitted by the light source D1 (5); wherein
   if at least one of four differences between the samples pr[1] and pr[0], pr[1] and pr[2], pr[3] and pr[2], pr[3] and pr[4] is lower than a threshold previously defined by a user of the replica in a calibration process, this state is treated as a released trigger, but if each difference between the samples pr[1] and pr[0], pr[1] and pr[2], pr[3] and pr[2], pr[3] and pr [4] is equal to or greater than the threshold defined by the user, this state is treated as a pressed trigger and a projectile launch process is activated.

5. The method according to claim 4, wherein the light source D1 (5) is a light-emitting diode or a laser diode.

6. The method according to claim 4, wherein the light receiver Q1 (6) is a phototransistor, a photodiode, a photoresistor or a CCD detector.

7. The method according to claim 4, wherein the calibration process is carried out by applications dedicated to various stationary and mobile devices, wherein
   during the calibration process a level of light intensity reaching the receiver is determined when the trigger (1) is released, and when the trigger (1) is pressed, and when the trigger (1) in the replica is pressed to a position activating a motor.

8. A trigger position detection system in replica firearms comprising a sensor consisting of two light sources D1 (5) and D2 (9) and one receiver Q1 (6) converting a light signal into an electrical signal, wherein the light sources D1 (5) and D2 (9) and the light receiver Q1 (6) are placed on two separate printed circuit boards (7 and 8) parallel to each other, between which the trigger (1) in the replica moves, wherein
   active surfaces of the light sources D1 (5) and D2 (9) and the light receiver Q1 (6) are directed towards the trigger, wherein
   positions of the light sources D1 (5) and D2 (9) and the light receiver Q1 (6) are strictly defined relative to a position of the trigger (1) in the replica, and edges of the active surfaces of the light source D1 (5) and the receiver Q1 (6) located closer to the trigger (1) in the replica are contained in a plane intersecting both printed circuit boards (7, 8) perpendicularly, wherein
   a distance between the light sources D1 (5) and D2 (9), the light receiver Q1 (6) and the trigger (1) is set in such a way that the trigger (1) in the replica in the released position forms a shadow originating from the light source D2 (9) over a small area of the active surface of the light receiver Q1 (6), wherein
   the light source D2 (9) is arranged in relation to light source D1 (5) so that there is only one position of the trigger (1) such that it forms a shadow originating from the light source D2 (9) over an entire active surface of the light receiver Q1 (6), wherein
   the light sources D1 (5) and D2 (9) are connected to a microcontroller pin, and the light receiver Q1 (6) is connected to an analog microcontroller pin equipped with an analog-to-digital converter or to an analog-to-digital converter U1 which is coupled with the microcontroller.

9. The system according to claim 8, wherein the light sources D1 (5) and D2 (9) are light-emitting diodes.

10. The system according to claim 8, wherein the light receiver Q1 (6) is a phototransistor, a photodiode, a photoresistor or a CCD detector.

11. A method for detecting a position of a trigger in replica firearms comprising controlling light sources D1 (5) and D2 (9) in such a way that at constant regular time intervals each time the light sources emit light for the same period of time the emitted light goes in a direction of a receiver Q1 (6), which alternately converts light intensity originating from the light sources D1 (5) and D2 (9) into an electric current and the intensity of light reaching the receiver Q1 (6) from environment of the replica, or the intensity of only the light reaching the receiver Q1 (6) from the environment of the replica, wherein
   the electric current flows through the resistor R2 generating voltage drop at its terminals, wherein
   an analog-to-digital converter converts the voltage of resistor R2 into a digital signal, and its value is stored in a buffer storing the last five results, wherein after each constant time interval voltage drop data is analyzed in a microcontroller and a difference between samples pr[1] and pr[0], pr[1] and pr[2], pr[3] and pr[2], pr[3] and pr[4] is calculated, wherein the samples pr[0], pr[2] and pr[4] constitute intensity value of only the light coming from the environment of the replica, and the samples pr[1] and pr[3] are a sum of the intensity of light emitted by the light sources D1 (5) and D2 (9) and the intensity of the incoming light from the surroundings of the replica, or the samples pr[0], pr[2] and pr[4] are the sum of the intensity of light coming from the environment of the replica and the intensity of light emitted by the light sources D1 (5) and D2 (9), and the samples pr [1] and pr [3] are the intensity value of the light emitted by the light sources D1 (5) and D2 (9), wherein when calculating a difference between values for the respective samples, the intensity of only the light emitted by the light sources D1 (5) and D2 (9) is obtained; wherein if at least one of the differences between samples pr[1] and pr[0], pr[1] and pr[2], pr[3] and pr[2], pr[3] and pr[4] is greater than the threshold previously defined by a replica user in a calibration process, it is treated as a released trigger, wherein if each difference between samples pr[1] and pr[0], pr[1] and pr[2], pr[3] and pr [2], pr [3] and pr [4] is equal to or less than the threshold defined by the user, it is treated as pressing the trigger (1) and this activates the projectile launch process.

12. The method according to claim 11, wherein the light sources D1 (5) and D2 (9) are light-emitting diodes.

13. The method according to claim 11, wherein the light receiver Q1 (6) is a phototransistor, a photodiode, a photoresistor, or a CCD detector.

14. The method according to claim 11, wherein the calibration process is carried out by applications dedicated to various stationary and mobile devices during which a level of light intensity reaching the receiver Q1 (6) is determined when the trigger (1) is released, when the trigger (1) is pressed, and when the trigger (1) is pressed to a position activating the motor.

15. The method according to claim 11, wherein the buffer storing the measurement results can contain any number of samples pr.

\* \* \* \* \*

UNITED STATES PATENT AND TRADEMARK OFFICE
CERTIFICATE OF CORRECTION

PATENT NO. : 10,782,091 B2
APPLICATION NO. : 16/382655
DATED : September 22, 2020
INVENTOR(S) : Menet et al.

Page 1 of 1

It is certified that error appears in the above-identified patent and that said Letters Patent is hereby corrected as shown below:

On the Title Page

Left Column, Item (30), Foreign Application Priority Data, after Dec. 17, 2018 delete "(EM).........................1813227" and insert --(EU).....................18213227.4-- instead.

Signed and Sealed this
First Day of December, 2020

Andrei Iancu
*Director of the United States Patent and Trademark Office*